US007865948B1

(12) United States Patent
Barnes et al.

(10) Patent No.: US 7,865,948 B1
(45) Date of Patent: *Jan. 4, 2011

(54) METHOD AND APPARATUS FOR RESTRICTED EXECUTION OF SECURITY SENSITIVE INSTRUCTIONS

(75) Inventors: Brian C. Barnes, Round Rock, TX (US); Rodney W. Schmidt, Dripping Springs, TX (US); Geoffrey S. Strongin, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 1771 days.

This patent is subject to a terminal disclaimer.

(21) Appl. No.: 10/005,248

(22) Filed: Dec. 3, 2001

(51) Int. Cl.
*H04L 29/06* (2006.01)
*G06F 21/00* (2006.01)

(52) U.S. Cl. .......................... 726/17; 713/167

(58) Field of Classification Search .............. 713/200, 713/164, 163, 193, 166, 167, 168; 726/26; 711/163–164
See application file for complete search history.

(56) References Cited

U.S. PATENT DOCUMENTS 4,949,238 A * 8/1990 Kamiya ....................... 711/164
4,962,533 A   10/1990 Krueger et al. ................ 380/25
5,561,788 A   10/1996 Letwin ......................... 395/500
5,802,590 A *  9/1998 Draves ......................... 711/164
6,249,872 B1   6/2001 Wildgrube et al. ........... 713/200

OTHER PUBLICATIONS

The common Man's Guide to Operating System Design. Web site,http://cdsmith.twu.net/professional/osdesign/ch01.html, The page was last Updated on Mar. 24, 2000. Retrived date Oct. 2, 2005.*
International PCT US 02/28855 Search Report dated Feb. 4, 2004.
International PCT US 02/40218 Search Report dated Dec. 17, 2004.
Eranian, Stephane "The Linux/ia64 project: kernel design and status update" dated Jul. 21, 2000 XP-002268094.

* cited by examiner

*Primary Examiner*—Gilberto Barron, Jr.
*Assistant Examiner*—Samson B Lemma
(74) *Attorney, Agent, or Firm*—Williams, Morgan & Amerson, P.C.

(57) ABSTRACT

A method and apparatus for restricting the execution of security sensitive instructions. A first security identification (ID) is associated with each of a plurality of instructions or a set of instructions that are to be executed by a processor. Software code running on the processor requests to execute at least one of the plurality of instructions or set of instructions. The processor obtains a second security ID associated with the software code running thereon and compares the second security ID with the first security ID. The processor executes the requested instruction or set of instructions providing that the second security ID matches the first security ID.

18 Claims, 6 Drawing Sheets

METHOD AND APPARATUS FOR RESTRICTED EXECUTION OF SECURITY SENSITIVE INSTRUCTIONS

BACKGROUND OF THE INVENTION

1. Field of the Invention

This invention relates generally to computers, and, more particularly, to a method and apparatus for ensuring the secure operation of a computer system.

2. Description of the Related Art

General purpose computing systems, such as personal computers, have evolved from performing a single task to performing a multitude of tasks executed simultaneously. Systems that multitask require security and protection services to protect their operating system from user processes, and to protect the processes from each other. Without protection, a rogue program, for example, could unintentionally destroy the program code or data in the memory space belonging to the operating system or to another process.

Figure 1:
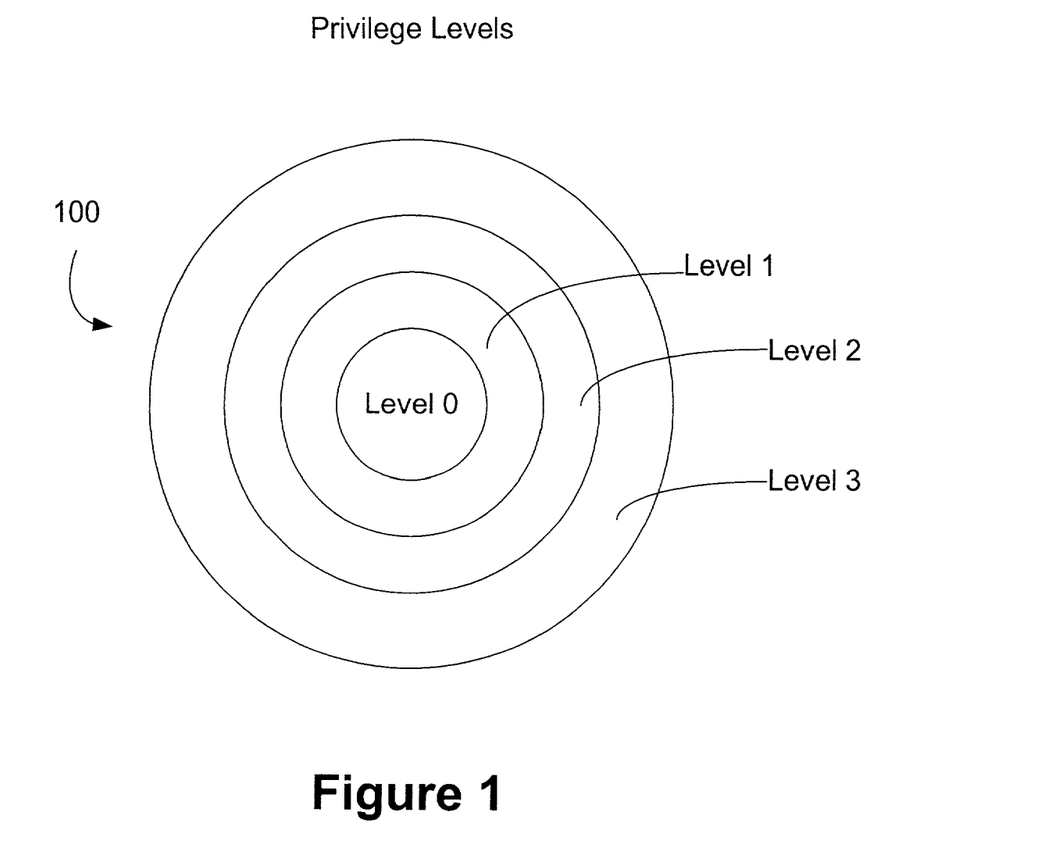
FIG. 1 schematically illustrates one embodiment of a conventional security scheme implemented in a computer system.

Typically, in x86 microprocessor environments, security features have been implemented to reduce the possibility of a rogue program by providing varying privilege levels. Different types of software run at these varying privilege levels, and, thus, have varying access to the resources of the computing system. As illustrated in FIG. 1, the operating system of the computer typically runs at the highest privilege level (i.e., level 0), which generally permits the operating system free access to virtually any of the system resources of the computer system. Software drivers are also permitted to run at the highest privilege level. Application programs, on the other hand, typically run at the lowest privilege level (i.e., level 3), and are generally permitted access to the system resources, but only by the permission of the operating system. Thus, at least theoretically, the operating system prevents one application program from accessing the system resources assigned to another application program. For example, the operating system assigns space in physical memory to the application programs, which are generally free to read and write within the assigned space only. That is, the operating system normally prevents one application program from modifying the contents of a portion of the physical memory that has been assigned to another application program.

Security defects and bugs, however, have inevitably penetrated their way into the operating system and drivers. Accordingly, it is possible that rogue programs or drivers could accidentally or intentionally use these security defects and bugs to gain access to portions of the memory from which they were intended to be excluded. Once a program or driver has access to otherwise protected memory, it can impede or even take over operation of the targeted software, including any peripheral devices associated therewith. For example, the operation of a modem in a data processor could be subverted by a rogue program that gains access to the memory space of the application program or driver originally associated with the modem. The rogue program could then instruct the modem to place unauthorized and undesirable calls over a telephone network, or to otherwise interfere with the proper operation of the telephone network.

The most recent version of Microsoft's Windows® operating system, Windows 2000®, now has over one million lines of code contained in its kernel and associated kernel-mode drivers. Thus, more than one million lines of code have generally free access to the system resources. Accordingly, owing to the sheer size of the operating system, additional defects and bugs will inevitably be uncovered. Thus, rogue programs may very well continue to exploit yet-to-be discovered security defects and bugs to accidentally or intentionally gain access to portions of memory from which they were intended to be shielded.

The present invention is directed to overcoming, or at least reducing the effects of, one or more of the problems set forth above.

SUMMARY OF THE INVENTION

In one aspect of the present invention, a method is provided. The method includes associating a first security identification (ID) with each of a plurality of instructions or a set of instructions that are to be executed by a processor. A request is made to execute at least one of the plurality of instructions or set of instructions by a software code running on the processor. A second security ID associated with the software code running on the processor is obtained. A comparison is made between the second security ID with the first security ID. The requested instruction or set of instructions is executed providing that the second security ID matches the first security ID.

In another aspect of the invention, an apparatus is provided. The apparatus comprises a processor for running code thereon, and for associating a first security identification (ID) with each of a plurality of instructions or a set of instructions that are to be executed by the processor. The processor receives a request to execute at least one of the plurality of instructions or set of instructions by the code running thereon, obtains a second security ID associated with the code, compares the second security ID with the first security ID, and executes the requested instruction or set of instructions providing that the second security ID matches the first security ID.

In another aspect of the invention, an article is provided. The article comprises one or more machine-readable storage media including instructions that when executed enable a processor to associate a first security identification (ID) with each of a plurality of instructions or a set of instructions that are to be executed by the processor, and request to execute at least one of the plurality of instructions or set of instructions by software code running on the processor. A second security ID associated with the software code running on the processor is obtained. A comparison is made between the second security ID with the first security ID. The requested instruction or set of instructions is executed providing that the second security ID matches the first security ID.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
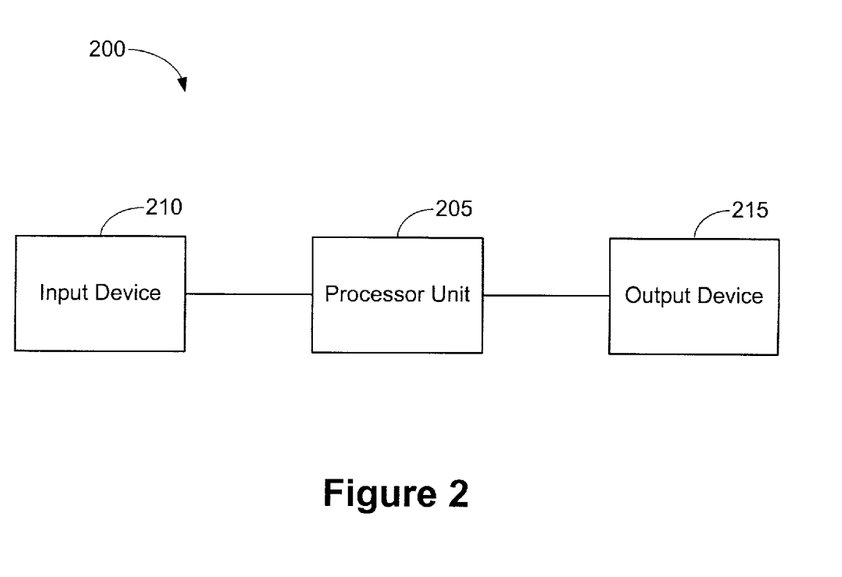
FIG. 2 shows a simplified block diagram of a computer system including a processor unit that employs a security access scheme according to one embodiment of the present invention.

Turning now to the drawings, and specifically referring to FIG. 2, a simplified block diagram of a computer system 200 for restricting the execution of security sensitive instructions is shown according to one embodiment of the present invention. In the illustrated embodiment, the computer system 200 in one of its simplest forms comprises a processor unit 205, at least one input device 210 and at least one output device 215. The input device 210 may include, for example, a keyboard, mouse, touchpad, touchscreen and the like. The output device 215 may include a monitor, printer, and/or various other devices to convey information to the system 200's user that is processed by the processor unit 205.

In accordance with the illustrated embodiment, the processor unit 205 employs a security access scheme, which restricts the system 200 from executing certain types of security sensitive instructions by the processor unit 205. The security sensitive instructions may include those instructions or set of instructions where it is desired to limit their execution by certain types of code running on the processor unit 205.

An input by the system 200's user via the input device 210 may initiate the execution of one or more software structures or codes in the processor unit 205. The memory resident in the processor unit 205 is then accessed to execute the various software structures or codes to implement the desired task. The security access scheme employed by the processor unit 205 may restrict the execution of some security sensitive instructions that are to be carried out by the processor 205 based upon predetermined security entries programmed therein, and, accordingly, prohibit certain computing tasks from being executed by the processor unit 205.

Figure 3:
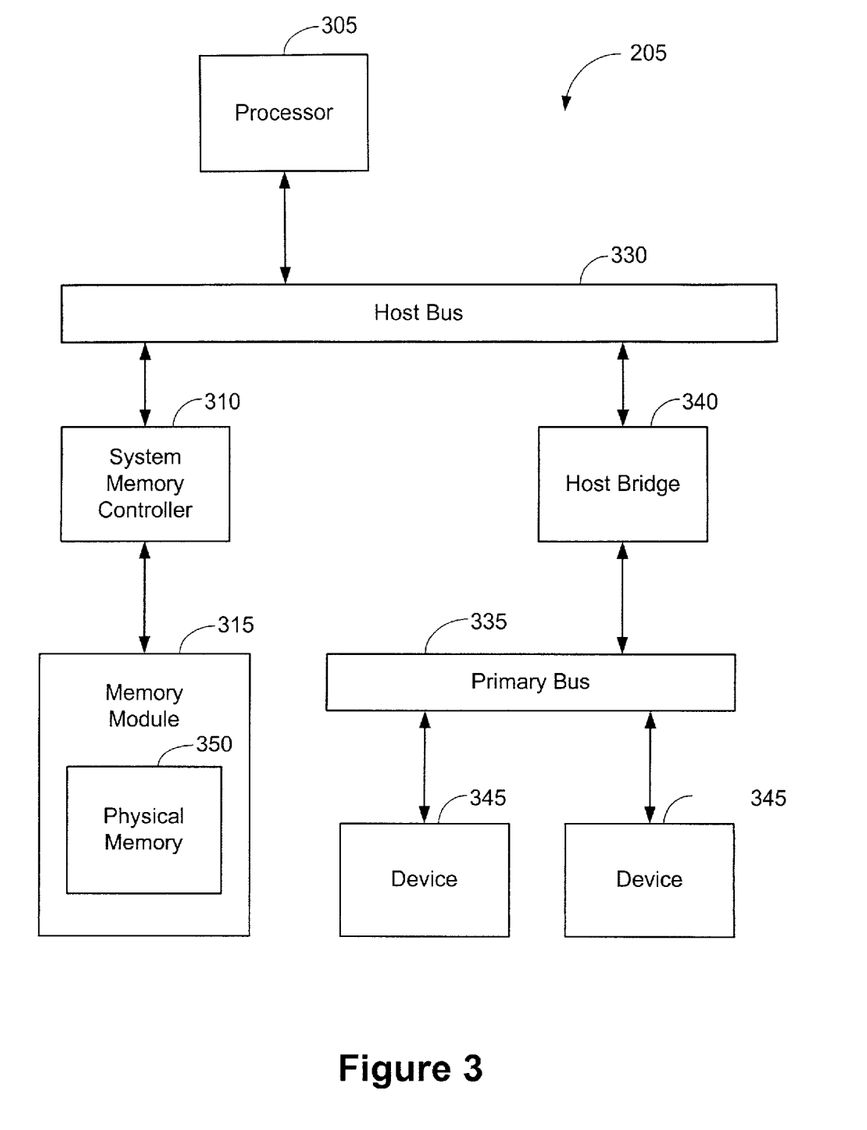
FIG. 3 provides a more detailed representation of the processor unit provided in FIG. 2.

Turning now to FIG. 3, a more detailed representation of the processor unit 205 of the system 200 is provided. In accordance with one embodiment of the present invention, the processor unit 205 comprises a processor 305, which takes the form of a microprocessor in the illustrated embodiment. It will be appreciated, however, that the processor 305 may take the form of various other processor types and may also include multiple processors without departing from the spirit and scope of the present invention. The processor unit 205 further includes a system memory controller 310 and a memory module 315. According to the illustrated embodiment, the memory module 315 includes a physical memory 350, which may take the form of a synchronous dynamic random access memory (SDRAM) or double-rate dynamic random access memory (DDRAM). It will be appreciated, however, that the physical memory 350 may take the form of a variety of other memory types, and, thus, need not be limited to the aforementioned examples.

The processor 305 communicates with the memory module 315 via the system memory controller 310 through a host bus 330. According to one embodiment, the system memory controller 310 provides memory addresses and logic signals to the memory module 315 to characterize the desired memory transactions by the processor 305.

A primary bus 335 that is used to communicate with peripheral devices 345 is also coupled to the host bus 330 through a host bridge 340. In one embodiment, the primary bus 335 takes the form of a peripheral component interconnect (PCI) bus (see PCI Specification, Rev. 2.1). It will also be appreciated that the processor unit 205 may further be configured to include other buses, such as a secondary PCI bus (not shown) or various other peripheral devices (not shown), without departing from the spirit and scope of the present invention.

In one embodiment, the processor 305 performs a plurality of computer processing operations based upon executable instructions. In response to a request to run a particular instruction by software code that is running thereon, the processor 305 performs a memory access procedure to carry out the appropriate execution prompted by the code. The processor 305 performs memory access via the system memory controller 310, which provides access to the physical memory 350 of the memory module 315 to perform the desired task upon execution of the particular instruction.

Figure 4:
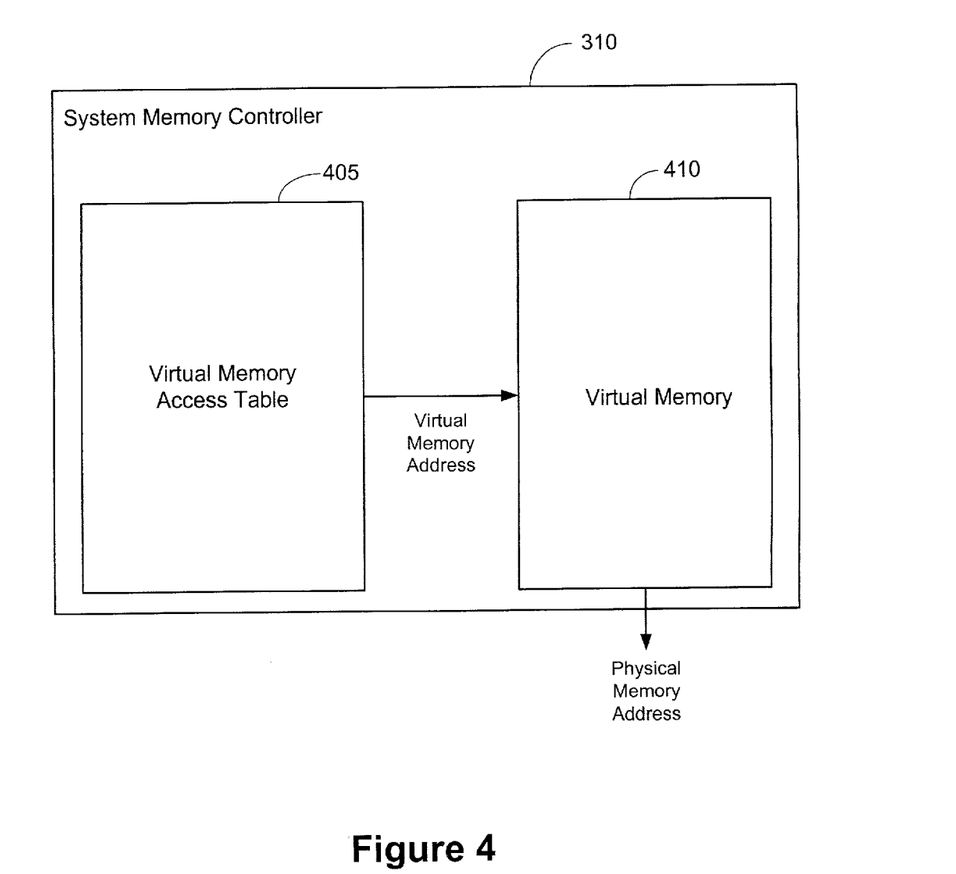
FIG. 4 illustrates a more detailed representation of a system memory controller that is provided in FIG. 3.

Turning now to FIG. 4, a more detailed representation of the system memory controller 310 is provided according to one embodiment of the present invention. The system memory controller 310 comprises a virtual memory access table 405 and a virtual memory 410. The processor 305 uses the virtual memory access table 405 to derive a virtual (or linear) memory address, which indicates a particular location within the virtual memory 410. Once the particular virtual memory address is determined, the virtual memory 410 is accessed to determine a physical memory address corresponding to the virtual memory address obtained from the virtual memory access table 405. The physical memory address obtained from the virtual memory 410 points to a particular memory location within the physical memory 350, which provides the memory space needed to perform the desired instruction by the software code that is currently running on the processor 305. It will be appreciated that the process for obtaining the virtual memory address (as described above) is provided in its most simplistic form and that various other tables may be accessed in addition to the virtual memory access table 405 to derive the virtual memory address. These particular procedures for deriving the virtual memory address are known to those skilled in the art. Accordingly, the specific details of such procedures are not provided herein to avoid unnecessarily obscuring the present invention.

According to one embodiment, a security identification (ID) may be associated with a particular security sensitive instruction or set of instructions that are executable by the processor 305. In one embodiment, the security ID may be a fixed value, or alternatively, may be stored in a programmable register (not shown) that may be resident in the processor 305. According to the illustrated embodiment, the security sensitive instructions may include moves to CR3 that define the virtual memory base, moves to CR0 that define the operating mode of the processor 305, and/or moves to CR4 that define various sub-modes of the processor 305. Additionally, any instructions that are configured to modify a programmable register defining the security ID for the various executable instructions may also be considered as security sensitive. It will be appreciated that the aforementioned list of examples is not necessarily exhaustive. Accordingly, various other types of instructions performed by the processor 305 may be considered security sensitive, and, thus, need not be limited to the examples provided above.

The security ID that is associated with the software code (e.g., driver, service, kernel routine, application code, etc.) currently being executed by the processor 305 is obtained by referencing the address of the virtual memory table 405 that corresponds to the security sensitive instruction or set of instructions that the code desires to execute. When a particular security sensitive instruction is requested by the currently executed code on the processor 305, the security ID of the currently executing code obtained by referencing the address of the virtual memory access table 405 is compared by the processor 305 to the security ID for the particular security instruction or set of instructions that the code desires to execute. As mentioned, the security ID of the security sensitive instruction(s) may be a fixed value or may be alterable and stored in a programmable register. If a match of the security IDs exist, the processor 305 executes the security sensitive instruction or set of instructions as requested by the software code running thereon. If, on the other hand, the security ID of the currently executing code and the security ID of the desired security sensitive instruction(s) do not match, the processor 305 denies the execution of the security sensitive instruction or set of instructions as requested by the software code running on the processor 305.

Figure 5A:
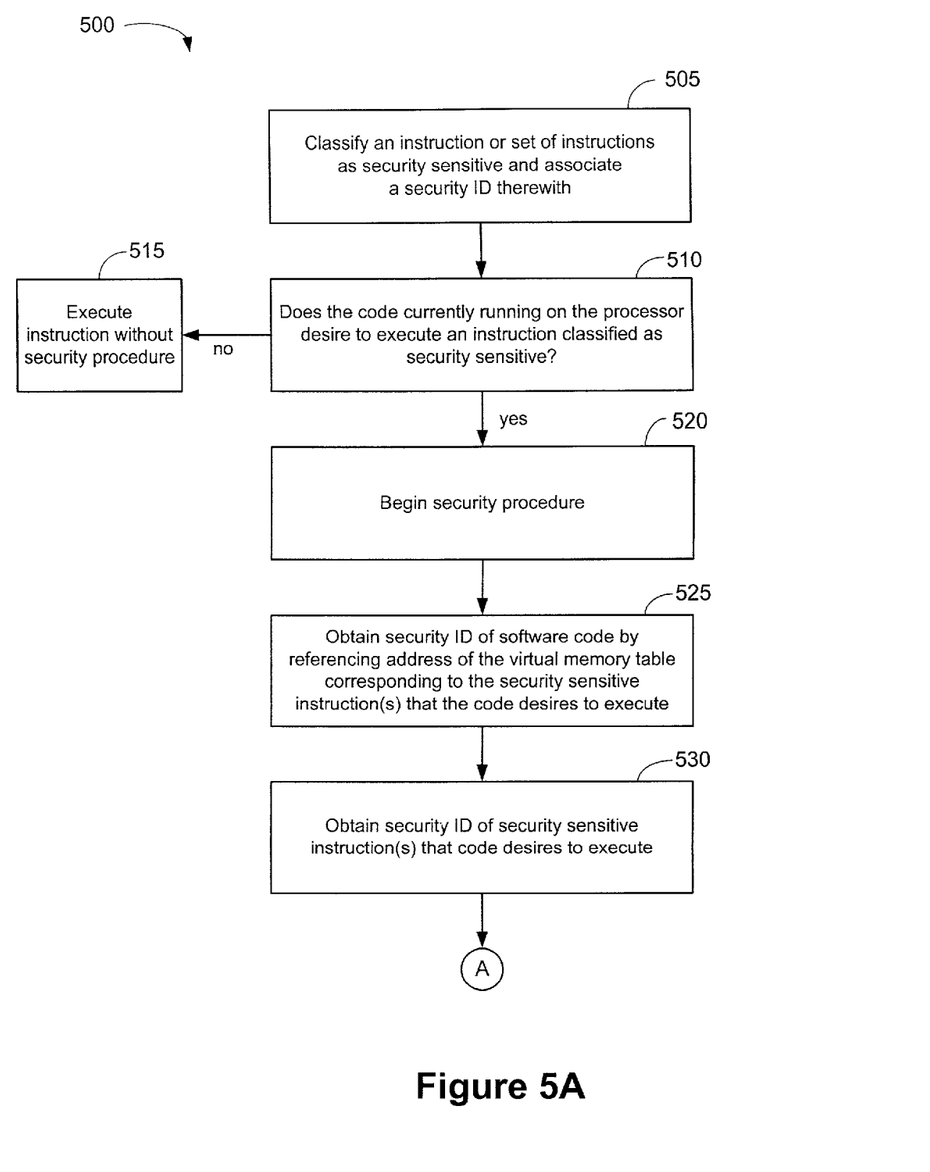
FIGS. 5A and 5B illustrate a process for restricting the execution of security sensitive instructions according to one embodiment of the present invention.
Figure 5B:
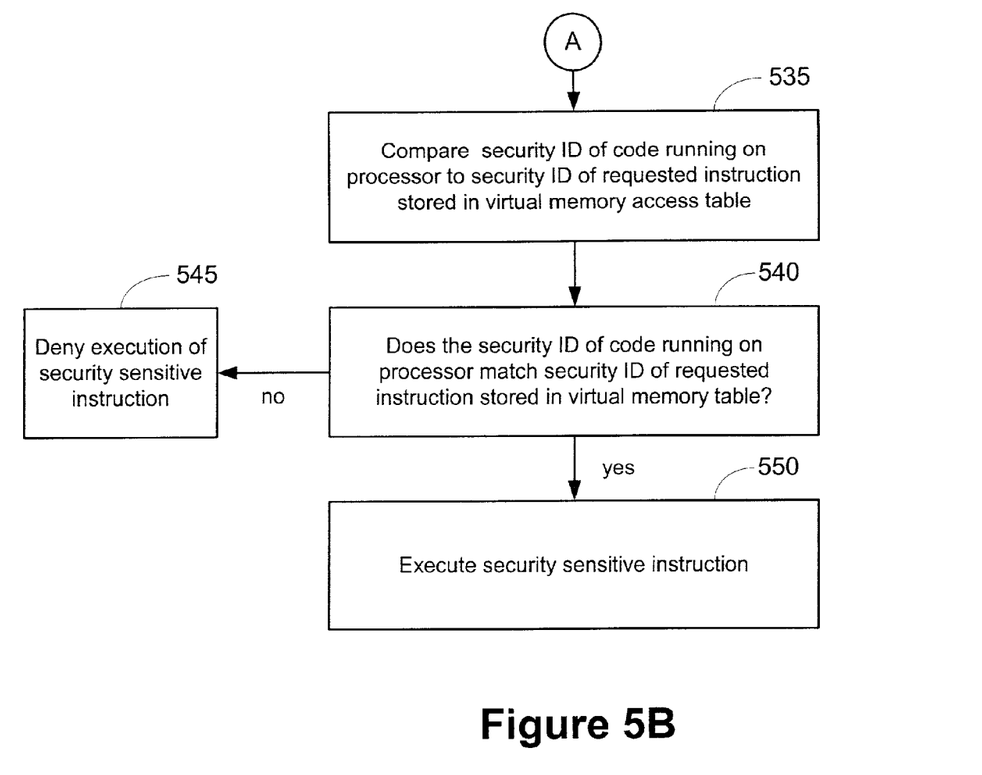

Turning now to FIG. 5, a process 500 for restricting the execution of security sensitive instructions by code running on the processor 305 is provided according to one embodiment. The process 500 commences at block 505 where an instruction or a set (i.e., grouping) of instructions are classified as security sensitive, and each such instruction or set of instructions is associated with a security ID at the processor 305. In accordance with one embodiment, the security ID may be a constant value (i.e., the security sensitive instructions may have a fixed security ID) associated with the security sensitive instruction(s). In an alternative embodiment, the security ID of the security sensitive instruction may be stored in a programmable register (not shown) at the processor 305, which the operating system running thereon may modify. It will be appreciated that other methods for associating a security ID with a security sensitive instruction(s) may be performed, in addition to the examples provided above, without departing from the spirit and scope of the present invention.

At block 510, the processor 305 determines whether the software code currently running thereon is attempting to execute an instruction that has been classified as security sensitive. In one embodiment, the processor 305 may determine if the requested instruction is security sensitive by referencing the programmable register of the processor 305, for example, to see if a security ID is associated therewith. If the software code currently miming on the processor 305 does not attempt to execute a security sensitive instruction (i.e., no security ID is associated with the requested instruction) at block 510, the processor 305 executes the instruction without invoking a security procedure at block 515 (i.e., the instruction is executed in a usual manner by the processor 305). If, however, the software code currently running on the processor 305 attempts to execute a security sensitive instruction in block 510, a security procedure is invoked by the processor 305 at block 520 to determine whether the code running on the processor 305 is authorized to execute the security sensitive instruction.

The process 500 continues at block 525 where a security ID of the software code running on the processor 305 is obtained by referencing an address of the virtual memory table 405 corresponding to the security sensitive instruction(s) that the code desires to execute. After obtaining the security ID associated with the software code running thereon, the processor 305 obtains the security ID of the security sensitive instruction(s) that the code desires to execute at block 530. In one embodiment, the security ID of the security sensitive instruction(s) may be obtained from a programmable register (not shown).

Subsequent to retrieving the security ID associated with the particular instruction from the virtual memory table 405, the processor 305 compares the security ID associated with the code running on the processor 305 and the security ID associated with the particular instruction at block 535. At block 540, the processor 305 determines whether the security ID associated with the code running thereon matches the security ID associated with the particular instruction that the code is attempting to execute.

If there is a mismatch between the security ID associated with the code running on the processor and the security ID associated with the particular instruction, the processor 305 denies execution of the security sensitive instruction by the software code running thereon at block 545. If there is a match between the security ID associated with the code running on the processor 305 and the security ID associated with the security sensitive instruction, the processor 305 executes the security sensitive instruction at block 550. According to one embodiment, when the security IDs match, the virtual memory address corresponding to the software code to be executed by the processor 305 is obtained from the virtual memory access table 405, the physical address is obtained from the virtual memory 410 using the virtual memory address, and the memory space within the physical memory 350 is made accessible to the processor 305 to execute the desired security sensitive instruction.

In accordance with one embodiment, a precise match between the security IDs is needed to execute the security sensitive instruction by the processor 305. It will be appreciated, however, that alternatively the security IDs may be broken up into fields, thus providing a multi-layered security scheme. Accordingly, although the software codes and security sensitive instructions may have unique security IDs in their entirety, a common field or component within the security ID would permit executing the desired security sensitive instruction. Thus, the security ID may be configured to establish and indicate classes, families or other grouping information such that a particular class of codes may be able to execute a particular instruction or set of instructions because a portion of their security IDs match.

For example, in one embodiment, the security ID may comprise a class and subclass field, and if the class field of the security IDs match, the subclass field of the security IDs may be disregarded (ignored) for comparison purposes between the security IDs. Accordingly, in this particular embodiment, execution of the security sensitive instruction(s) by the processor 305 may be permitted providing that at least the class fields of the security IDs match. In another embodiment, the comparison of the security IDs (or a portion thereof, such as a class field, for example) need not necessarily be an exact arithmetic match. For example, if the class field of the security ID associated with the code running on the processor 305 is greater than (or, alternatively, less than) or equal to the class code of the security ID associated with the security sensitive instruction(s), then execution of the security sensitive instruction may be permitted. It will be appreciated, however, that the particular format to the security IDs need not necessarily be limited to the examples provided above.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
    associating a first security identification (ID) with each of a plurality of instructions or a set of instructions that are to be executed by a processor;
    requesting to execute at least one of the plurality of instructions or set of instructions by a software code running on the processor;
    determining if the requested instruction is classified as security sensitive by determining whether the requested instruction has the first security ID that is stored;
    classifying at least one instruction or set of instructions from a plurality of instructions that are to be executed by a processor as being security sensitive;
    obtaining a second security ID associated with the software code running on the processor if the at least one of the plurality of instructions is determined to be security sensitive;
    comparing the second security ID with the first security ID; and
    executing the requested instruction or set of instructions based directly upon determining that the second security ID matches the first security ID.

2. The method of claim 1, further comprising:
    denying the execution of the requested instruction or set of instructions providing that the first and second security IDs mismatch.

3. The method of claim 1, wherein associating a first security identification (ID) further comprises:
    storing a first security identification (ID) with each of a plurality of instructions or a set of instructions that are to be executed by a processor.

4. The method of claim 1, wherein associating a first security identification (ID) further comprises:
    associating a first security identification (ID) with each of the instructions or set of instructions that are classified as security sensitive.

5. The method of claim 1, wherein comparing the second security ID with the first security ID further comprises:
    comparing a portion of the second security ID with a portion of the first security ID.

6. The method of claim 5, wherein executing the requested instruction or set of instructions providing that the second security ID matches the first security ID further comprises:
    executing the requested instruction or set of instructions providing that the portion of the second security ID matches the portion of the first security ID.

7. An apparatus, comprising:
    a processor for running code thereon, and for associating a first security identification (ID) with each of a plurality of instructions or a set of instructions that are to be executed by the processor, wherein the processor classifies at least one instruction or set of instructions from a plurality of instructions that are to be executed as being security sensitive;
    wherein the processor determines whether the requested instruction is classified as security sensitive by determining if the requested instruction has the first security ID stored therewith in a programmable register, wherein and the processor obtains the second security ID associated with the software code running on the processor providing the requested instruction was determined to be security sensitive; and
    wherein the processor receives a request to execute at least one of the plurality of instructions or set of instructions by the code running thereon, obtains a second security ID associated with the code, compares the second security ID with the first security ID, and executes the requested instruction or set of instructions based directly upon determining the second security ID matches the first security ID.

8. The apparatus of claim 7, wherein the processor denies the execution of the requested instruction or set of instructions providing that the first and second security IDs mismatch.

9. The apparatus of claim 7, wherein the processor stores the first security identification (ID) with each of a plurality of instructions or a set of instructions that are to be executed by a processor within a programmable register.

10. The apparatus of claim 7, wherein the processor associates the first security identification (ID) with each of the instructions or set of instructions that are classified as security sensitive.

11. The apparatus of claim 7, wherein the processor compares at least a portion of the second security ID with at least a portion of the first security ID.

12. The apparatus of claim 11, wherein the processor executes the requested instruction or set of instructions providing that the portion of the second security ID matches the portion of the first security ID.

13. An article comprising one or more non-transitory machine-readable storage media including instructions that when executed enable a processor to perform:
    associating a first security identification (ID) with each of a plurality of instructions or a set of instructions that are to be executed by the processor;
    requesting to execute at least one of the plurality of instructions or set of instructions by a software code running on the processor;
    determining if the requested instruction is classified as security sensitive by determining whether the requested instruction has the first security ID that is stored;
    classifying at least one instruction or set of instructions from a plurality of instructions that are to be executed by a processor as being security sensitive;
    obtaining a second security ID associated with the software code running on the processor if the at least one of the plurality of instructions is determined to be security sensitive;
    comparing the second security ID with the first security ID; and
    executing the requested instruction or set of instructions based directly upon determining the second security ID matches the first security ID.

14. The article of claim 13, further comprising:
denying the execution of the requested instruction or set of instructions providing that the first and second security IDs mismatch.

15. The article of claim 13, wherein associating a first security identification (ID) further comprises:
storing a first security identification (ID) with each of a plurality of instructions or a set of instructions that are to be executed by a processor.

16. The article of claim 13, wherein associating a first security identification (ID) further comprises:
associating a first security identification (ID) with each of the instructions or set of instructions that are classified as security sensitive.

17. The article of claim 13, wherein comparing the second security ID with the first security ID further comprises:
comparing a portion of the second security ID with a portion of the first security ID.

18. The article of claim 17, wherein executing the requested instruction or set of instructions providing that the second security ID matches the first security ID further comprises:
executing the requested instruction or set of instructions providing that the portion of the second security ID matches the portion of the first security ID.

\* \* \* \* \*

UNITED STATES PATENT AND TRADEMARK OFFICE
CERTIFICATE OF CORRECTION

PATENT NO. : 7,865,948 B1
APPLICATION NO. : 10/005248
DATED : January 4, 2011
INVENTOR(S) : Brian C. Barnes, Rodney Schmidt and Geoffrey Strongin Page 1 of 1

It is certified that error appears in the above-identified patent and that said Letters Patent is hereby corrected as shown below:

Claim 7, column 8, line 12 should read:

ID stored therewith within a programmable register, wherein

Signed and Sealed this
Twenty-third Day of August, 2011

David J. Kappos
*Director of the United States Patent and Trademark Office*